United States Patent [19]

Hunt

[11] Patent Number: 5,231,258
[45] Date of Patent: Jul. 27, 1993

[54] DOUBLE CHAMBER SLIDING BACKPURGE DEVICE FOR GAS SHIELDED ARC WELDING

[75] Inventor: James F. Hunt, Mt. Vernon, Ind.
[73] Assignee: The Babcock & Wilcox Company, New Orleans, La.
[21] Appl. No.: 772,735
[22] Filed: Oct. 7, 1991
[51] Int. Cl.⁵ ............................................... B23K 9/16
[52] U.S. Cl. ...................................... 219/74; 228/219
[58] Field of Search .................... 219/74, 136; 228/219

[56] References Cited

U.S. PATENT DOCUMENTS 4,956,537  9/1990  Schnorrer ........................... 219/74

FOREIGN PATENT DOCUMENTS 446035  3/1949  Italy ....................................... 219/74

Primary Examiner—Clifford C. Shaw
Attorney, Agent, or Firm—Vytas R. Matas; Robert J. Edwards

[57] ABSTRACT

A sliding backpurge device for supplying shielding gas to an arc welding process comprises a concave primary gas chamber surrounded by inner and outer seals which define a pressurized secondary gas chamber therebetween. Pressurized secondary gas is supplied to the secondary gas chamber and primary gas is supplied to the primary chamber. Any leaks which do form, minimize impact on the shield gas within the primary chamber despite sliding engagement of the inner and outer seals over the surface to be welded since secondary gas rather than atmospheric gas leaks into the primary chamber..

5 Claims, 3 Drawing Sheets

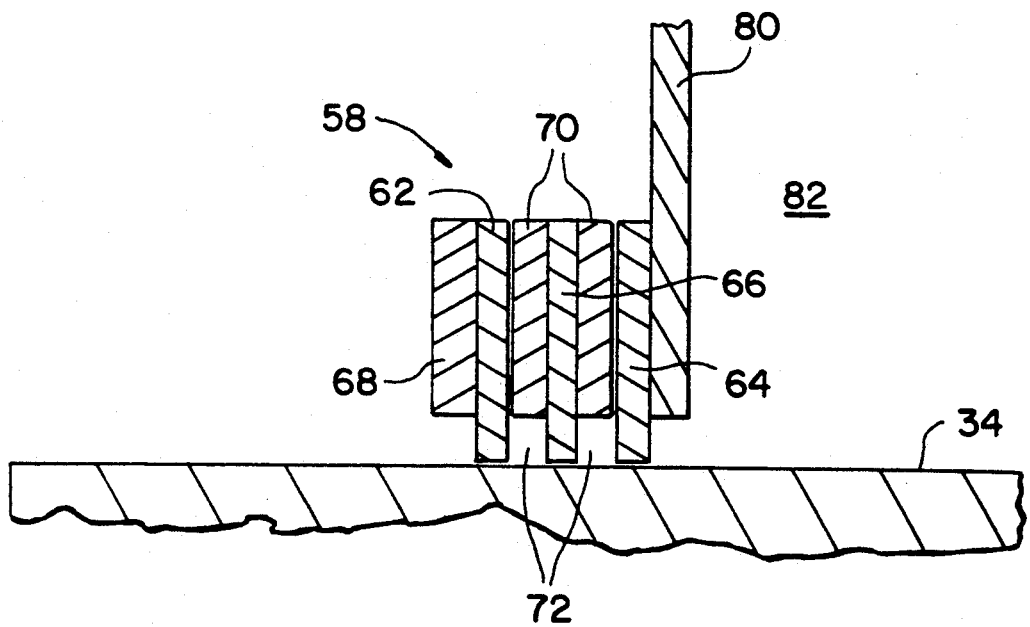
FIG.IB
PRIOR ART

DOUBLE CHAMBER SLIDING BACKPURGE DEVICE FOR GAS SHIELDED ARC WELDING

FIELD AND BACKGROUND OF THE INVENTION

The present invention relates in general to welding techniques, and in particular, to a new and useful apparatus for supplying backpurging gas to a localized area in which a welding operation is to take place.

Backpurging is generally used during welding with gas shielded welding processes to protect the backside of the weld from atmospheric gases to prevent oxidation. Backpurging becomes necessary as the surface quality requirement of the weld backside (side opposite the welding torch) increase. As the oxidation potential of a base material increases so does the likelihood that backpurging will be required. Oxidation of the backside is generally avoided by using a backpurge of an inert gas such as Argon or Helium.

Several methods of backpurging are commonly used. They are: area purge, fixed local purge and sliding local purge. An area purge consists of purging the entire backside of the area to be welded. Area purges are generally used for tubes and small vessels where the volume of backpurge gas is small. A fixed local purge is generally used on large vessels where purging the entire inside of the vessel would not be practical due to size or configuration. A fixed local purge chamber is usually made of an rigid material and sealed to the vessel with tape or an expandable bladder. A sliding local purge can be used on large vessels where a fixed local purge or area purge is not practical. The sliding local purge chamber is generally made of metal and has sliding seals which seal the chamber to the vessel.

The sliding seals used on sliding local purge chambers are generally O-rings. Referring to FIG. 1 which illustrates a typical sliding chamber seal arrangement, the typical local sliding chamber comprises a chamber wall 10 defining a concave volume 12 which receives inert backpurge gas through a shield gas inlet 14. The chamber wall includes a peripheral flange 16 which, as best shown in FIG. 1A, includes a recess 18 that confines an O-ring 20 which slides against the upper surface 22 of a member on which welding is to be performed such as a boiler vessel. The O-rings are subject to wear from sliding friction, deterioration from exposure to heat, and deterioration from ozone generated by the welding arc. This wear and deterioration causes seal leakage as welding arc time and chamber sliding time increases. This leakage in turn leads to a backpurge of lesser quality and therefore weld surface oxidation.

FIG. 1B shows an alternate prior art construction where a primary chamber wall 80 defines a concave primary gas chamber 82 having a peripheral seal arrangement generally designated 58 comprising two or more spaced seals 62, 66 and 64 separated by spacers 70 and a clamp 68 which connects the seals to the chamber wall 80. This defines a pair of void spaces 72 which receive some leakage of shield gas from the space 82 but which is subjected to wear just as the O-ring seal of FIG. 1A. Although the seal arrangement of FIG. 1B is less prone to leakage than the arrangement of FIG. 1A, the multiseal arrangement requires more room to accommodate the additional seals and raises problems of alignment for the multiple seals. Lack of alignment inherently produces a leakage problem. Since voids 72 are not pressurized, atmosphere air may leak into chamber 82.

SUMMARY OF THE INVENTION

An object of the present invention is to provide a secondary shield gas chamber which contains inert gas and which surrounds the primary sliding local gas shield chamber, in particular for welding boiler vessels.

The present invention thus provides the combination of a primary sliding local backpurge chamber surrounded by a secondary pressurized shield gas chamber. The invention creates a secondary pressurized shield gas chamber around the primary chamber so that when seal wear or seal leakage of the primary sliding seal occurs, the secondary chamber will aspirate inert shielding gas into the primary shielding chamber instead of oxidizing gases from the atmosphere.

Accordingly, another object of the present invention is to provide a sliding backpurge device comprising: a primary chamber wall defining a concave primary chamber for movement over a surface to be subjected to welding, the primary chamber wall including a primary shield gas inlet for receiving a shield gas into the concave primary chamber; means defining a secondary gas chamber around a periphery of the primary chamber wall, the secondary gas chamber extending around the concave primary chamber; inner seal means between the secondary gas chamber and the primary chamber, the inner seal means being slideable against the surface for separating the secondary gas chamber from the primary chamber; outer seal means spaced outwardly of the inner seal means and outwardly bounding the secondary gas chamber, the outer seal means being slideable against the surface for confining secondary gas in the secondary gas chamber; and the means defining the secondary gas chamber including a secondary gas inlet for receiving pressurized secondary gas into the secondary gas chamber.

Another object of the present invention is to provide a sliding backpurge device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

BRIEF DESCRIPTION OF THE DRAWINGS

In the drawings:

FIG. 1B is a view similar to FIG. 1A showing an alternate known arrangement using multiple seals at the outer periphery of a concave primary gas chamber;

DESCRIPTION OF THE PREFERRED EMBODIMENTS

Figure 1:
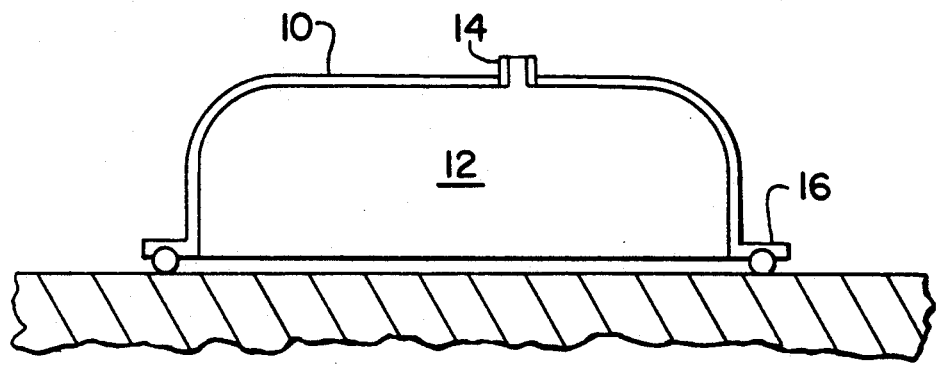
FIG. 1 is a sectional view illustrating a conventional local sliding chamber.
Figure 1A:
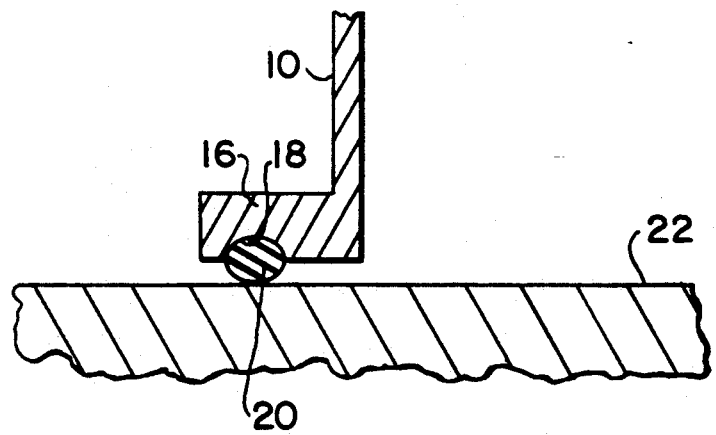
FIG. 1A is an enlarged sectional view of the seal carrying portion of the chamber shown in FIG. 1.
Figure 2:
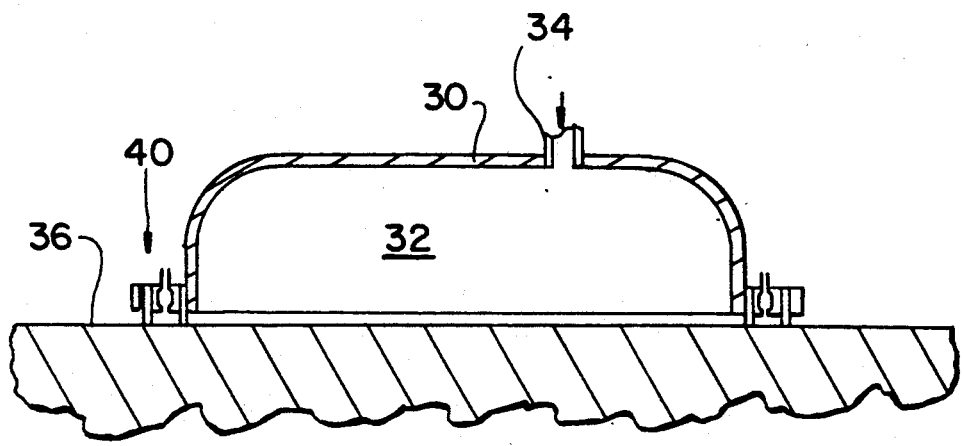
FIG. 2 is a sectional view of a double chamber backpurge device according to the present invention.

Referring to the drawings in particular, the invention embodied in FIG. 2 comprises a backpurge chamber device comprising a primary chamber wall 30 defining a primary concave primary chamber 32, which receives inert primary shield gas through a primary shield gas inlet 34. Chamber 30 is slideable over a surface 36 to be subjected to welding by an arc welding process contained in the concave chamber 32, such as a boiler vessel.

Figure 2A:
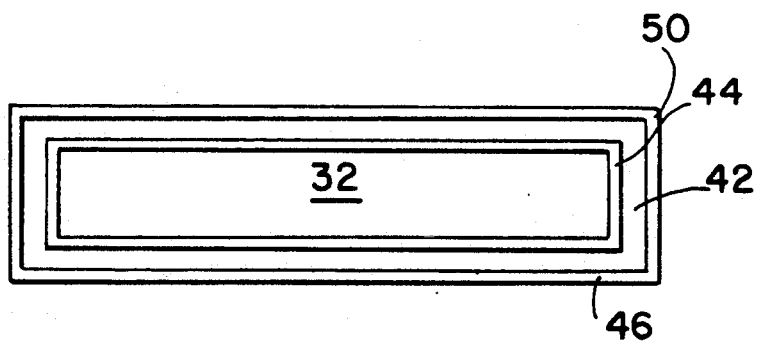
FIG. 2A is a bottom plan view of the device shown in FIG. 2, illustrating the inner and outer seals defining the secondary gas chamber of the device.
Figure 2B:
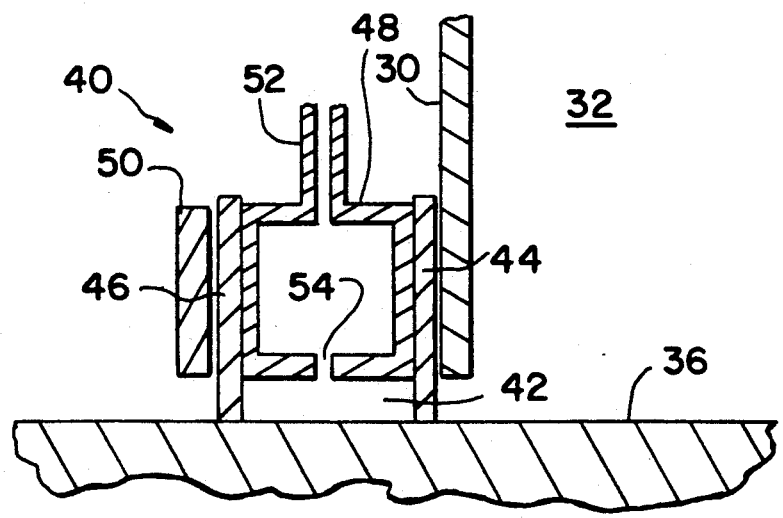
FIG. 2B is an enlarged sectional view showing the seal area of the secondary chamber.

Means generally designated 40 are provided around the periphery of primary chamber wall 30 for defining a pressurized secondary gas chamber 42 best shown in FIGS. 2A and 2B. The secondary gas chamber 42 is inwardly confined by an inner or primary seal 44, made for example, of aramid fiber and slideably engaged on surface 36. Secondary gas chamber 42 is outwardly bounded by an outer or secondary seal 46 which may also be made of aramid fiber. A secondary gas diffuser having a square or rectangular cross section 48 is positioned between seals 44 and 46 with the seals and diffuser being fixed to the primary chamber wall 30 by a secondary seal clamp 50 using screws, bolts, rivets or any other conventionally mechanism. Diffuser 48 receives secondary gas under pressure through an inlet 52. The gas moves along the full length of the diffuser 48 before it is discharged through a plurality of orifices 54 into the secondary gas chamber 42.

The present invention, thus utilizing a distinct pressurized secondary gas chamber 42, allows for some leakage without degrading the composition of shield gas within the concave chamber 32 since purge gas will leak into chamber 32 from chamber 42, and not atmospheric gas.

Use of a sliding local backpurge chamber consisting of a primary local sliding backpurge chamber surrounded by a secondary pressurized gas chamber has the following advantages over a conventional single chamber sliding backpurge chamber:

a) A superior seal which is less prone to leakage is provided;

b) Atmospheric contamination of the shielding gas contained in the primary chamber is decreased and therefore the backpurge gas quality is increased because the secondary gsa chamber prevents aspiration of atmospheric gases into the primary backpurge chamber;

c) Wear and deterioration of the sliding seals becomes less critical in maintaining a good quality backpurge because aspiration of oxidizing gases from the atmosphere into the primary backpurge chamber due to the primary seal leakage is minimized. The secondary gas chamber serves as an "inert gas curtain" between the primary backpurge chamber and the atmosphere; and d) Backpressure within the primary backpurge chamber is controlled more accurately because the secondary gas chamber provides a positive pressure on both the inside and the outside of the primary chamber sliding seal. Therefore leakage of the primary seal is compensated for by the secondary gas chamber pressure.

While a specific embodiment of the invention has been shown and described in detail to illustrate the application of the principles of the invention, it will be understood that the invention may be embodied otherwise without departing from such principles.

What is claimed is:

1. A sliding backpurge device preventing oxidizing gas from the atmosphere from reaching a welding surface comprising:

a primary chamber wall defining a concave primary chamber for movement over a surface to be subjected to welding, the primary chamber wall including a primary shield gas inlet for receiving a shield gas into the concave primary chamber;

means defining a secondary gas chamber around a periphery of the primary chamber wall, the secondary gas chamber extending around the concave primary chamber;

inner seal means between the secondary gas chamber and the primary chamber, the inner seal means being slideable against the surface for separating the secondary gas chamber from the primary chamber;

outer seal means spaced outwardly of the inner seal means and outwardly bounding the secondary gas chamber, the outer seal means being slideable against the surface for confining secondary gas in the secondary gas chamber; and the means defining the secondary gas chamber including a secondary gas inlet receiving pressurized secondary gas into the secondary gas chamber to aspirate secondary gas into said primary chamber rather than an oxidizing gas from the atmosphere.

2. A device according to claim 1 wherein said means defining the secondary gas chamber includes a gas diffuser carrying the secondary gas inlet and positioned between the inner and outer seal means, the inner and outer seal means extending beyond the gas diffuser toward the surface and the gas diffuser including at least one aperture communicating with the secondary gas chamber.

3. A device according to claim 2 wherein the diffuser has a rectangular cross section.

4. A device according to claim 1 wherein the inner and outer seal means comprise respective inner and outer seals, the inner and outer seals being rectangular in shape, around the primary chamber wall.

5. A device according to claim 1 wherein the inner and outer seal means comprise respective inner and outer seals made of aramid fiber.

* * * * *